US008781210B2

(12) United States Patent
Scheid et al.

(10) Patent No.: US 8,781,210 B2
(45) Date of Patent: *Jul. 15, 2014

(54) METHOD AND SYSTEM FOR AUTOMATED DEFECT DETECTION

(75) Inventors: Paul Raymond Scheid, West Hartford, CT (US); Richard C. Grant, Ellington, CT (US); Alan Matthew Finn, Hebron, CT (US); Hongcheng Wang, Vernon, CT (US); Ziyou Xiong, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/292,340

(22) Filed: Nov. 9, 2011

(65) Prior Publication Data

US 2013/0114879 A1    May 9, 2013

(51) Int. Cl.
*G06K 9/00*    (2006.01)

(52) U.S. Cl.
USPC ......................................................... 382/145

(58) Field of Classification Search
None
See application file for complete search history.

(56) References Cited

U.S. PATENT DOCUMENTS

| | | | |
|---|---|---|---|
| 5,070,401 A | 12/1991 | Salvati et al. | |
| 5,619,429 A | 4/1997 | Aloni et al. | |
| 5,774,212 A | 6/1998 | Corby | |
| 6,153,889 A | 11/2000 | Jones | |
| 6,362,875 B1 | 3/2002 | Burkley | |
| 6,424,733 B2 | 7/2002 | Langley | |
| 7,099,078 B2 | 8/2006 | Spencer | |
| 7,489,811 B2 | 2/2009 | Brummel et al. | |
| 7,518,632 B2 | 4/2009 | Konomura | |
| 7,564,626 B2 | 7/2009 | Bendall et al. | |
| 7,619,728 B2 | 11/2009 | Ogburn et al. | |
| 7,656,445 B2 | 2/2010 | Heyworth | |
| 7,758,495 B2 | 7/2010 | Pease et al. | |
| 2002/0128790 A1 | 9/2002 | Woodmansee | |
| 2003/0063270 A1 | 4/2003 | Hunik | |
| 2004/0183800 A1* | 9/2004 | Peterson | 345/440 |

(Continued)

FOREIGN PATENT DOCUMENTS

WO    WO 2010/020338 A1    2/2010

OTHER PUBLICATIONS

Candès, Emmanuel J., et al. "Robust principal component analysis?." arXiv preprint arXiv:0912.3599 (2009).*

*Primary Examiner* — Stephen R Koziol
*Assistant Examiner* — Amandeep Saini
(74) *Attorney, Agent, or Firm* — Miller, Matthias & Hull LLP

(57) ABSTRACT

A computer program product and method for performing automated defect detection of blades within an engine is disclosed. The method may include providing a storage medium for storing data and programs used in processing video images, providing a processing unit for processing images, receiving from a borescope an initial set of images of a plurality of members inside of a device, and using the processing unit to apply Robust Principal Component Analysis to decompose the initial set of images into a first series of low rank component images and a second series of sparse component images, wherein there are at least two images in the initial series.

20 Claims, 5 Drawing Sheets

(56) References Cited

U.S. PATENT DOCUMENTS

| | | |
|---|---|---|
| 2004/0183900 A1 | 9/2004 | Karpen et al. |
| 2004/0242961 A1 | 12/2004 | Bughici |
| 2005/0016857 A1 | 1/2005 | Kovarsky et al. |
| 2005/0129108 A1 | 6/2005 | Bendall et al. |
| 2006/0050983 A1 | 3/2006 | Bendall et al. |
| 2011/0013846 A1 | 1/2011 | Hori |
| 2011/0025844 A1 | 2/2011 | Hori |
| 2011/0026805 A1 | 2/2011 | Hori |

\* cited by examiner

METHOD AND SYSTEM FOR AUTOMATED DEFECT DETECTION

TECHNICAL FIELD OF THE DISCLOSURE

The present disclosure relates to automated inspection techniques and, more particularly, relates to automated visual inspection techniques of images or videos captured by image capture devices such as borescopes.

BACKGROUND OF THE DISCLOSURE

Video inspection systems, such as borescopes, have been widely used for capturing images or videos of difficult-to-reach locations by "snaking" image sensor(s) to these locations. Applications utilizing borescope inspections include aircraft engine blade inspection, power turbine blade inspection, internal inspection of mechanical devices, and the like.

A variety of techniques for inspecting the images or videos provided by borescopes for determining defects therein have been proposed in the past. Most such techniques capture and display images or videos to human inspectors for defect detection and interpretation. Human inspectors then decide whether any defect within those images or videos exists. When human inspectors look at many similar images of very similar blades of an engine stage, sometimes they miss defects because of the repetitive nature of the process or because of physical fatigue experienced by the inspector. Missing a critical defect may lead to customer dissatisfaction, transportation of an expensive engine back to service centers, lost revenue, or even engine failure.

Some other techniques utilize automated inspection techniques with many manually-set detection thresholds that are error-prone in an automated or semi-automated inspection system. In some of these other techniques, common defects are categorized into classes such as leading edge defects, erosion, nicks, cracks, or cuts and any incoming images or videos from the borescopes are examined to find those specific classes of defects. These techniques are thus focused on low-level feature extraction and identify damage by matching features and comparing to thresholds. Although somewhat effective, categorizing all kinds of blade damage defects within classes is difficult and images having defects other than those pre-defined classes are not detected.

Accordingly, it would be beneficial if an improved technique for performing borescope inspections were developed. It would additionally be beneficial if such a technique were automated, thus minimizing human intervention and the multiplicity of manually tuned thresholds.

SUMMARY OF THE DISCLOSURE

In accordance with one aspect of the present disclosure, a method of performing automated defect detection is disclosed. The method may include providing a storage medium for storing data and programs used in processing images, providing a processing unit for processing the images, receiving from an image capture device an initial set of images of a plurality of members inside of a device, and using the processing unit to apply Robust Principal Component Analysis to decompose the initial set of images into a first series of low rank component images and a second series of sparse component images, wherein there are at least two images in the initial set.

In accordance with another aspect of the present disclosure, a method for performing automated defect detection on blades in an aircraft engine is disclosed. The method may include providing a storage medium for storing data and programs used in processing video images, providing a processing unit for processing video images, receiving from a borescope video images of a plurality of the blades of the engine, using the processing unit to decompose each of the video images using Robust Principal Component Analysis (RPCA) into a low rank matrix and a sparse matrix, and utilizing video image data in the sparse matrix to determine whether there are possible defects within the plurality of blades.

In accordance with yet another aspect of the present disclosure, a computer program product is disclosed. The computer program product may comprise a computer usable medium having a computer readable program code embodied therein. The computer readable program code may be adapted to be executed to implement a method for performing automated defect detection on blades in an aircraft engine. Such method may comprise receiving from a borescope video images of a plurality of the blades of the engine, and decomposing each of the video images using Robust Principal Component Analysis into a low rank matrix and a sparse matrix, wherein data in the sparse matrix may be indicative of defects in the blades.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
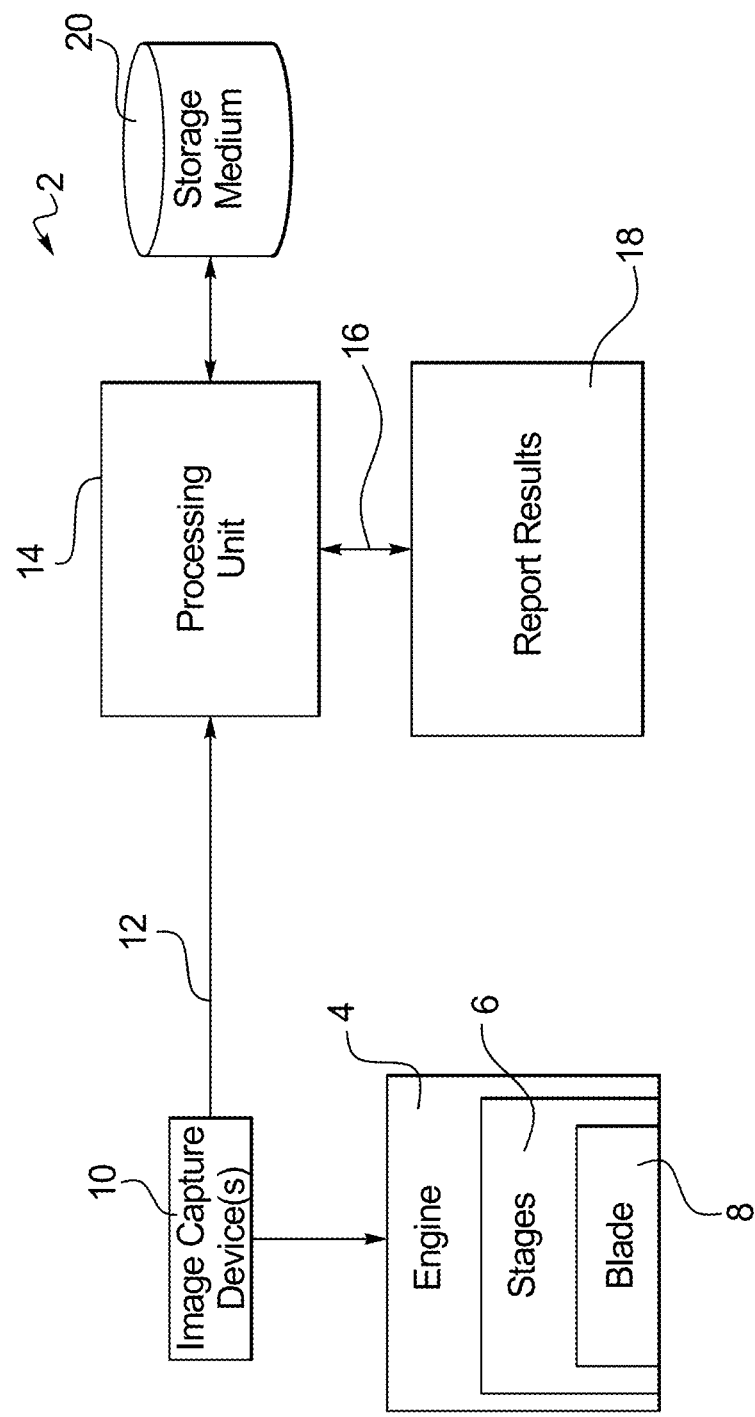
FIG. 1 is a schematic illustration of an embodiment of an automated borescope inspection system, in accordance with the present disclosure.

Referring to FIG. 1, a schematic illustration of an automated defect detection system 2 is shown, in accordance with at least some embodiments of the present disclosure. In at least some embodiments, the automated defect detection system 2 may be an automated borescope inspection (ABI) system. As shown, the ABI system 2 may include an engine 4 having a plurality of stages 6, each of the stages having a plurality of blades 8, some or all of which may require visual inspection periodically, at predetermined intervals, or based on other criteria by an image capture device 10. The engine 4 may be representative of a wide variety of engines such as jet aircraft engines, aeroderivative industrial gas turbines, steam turbines, diesel engines, automotive and truck engines, and the like. Notwithstanding the fact that the present disclosure has been described in relation to visual inspection of the blades 8 of an engine 4, in other embodiments, the ABI system 2 may be employed to inspect other parts of the engine 4, as well as to perform inspection on the parts or members of other types of equipment and devices. Such parts/members are not limited to blades. For example, the ABI system 2 may be used for processing medical endoscope images, inspecting critical interior surfaces in machined or cast parts, forensic inspection, inspection of civil structures such as buildings bridges, piping, etc.

The image capture device 10 may be an optical device having an optical lens or other imaging device or image sensor at one end and capable of capturing and transmitting images or videos through a communication channel 12 to a processing unit 14. In the preferred embodiment the image capture device 10 may be representative of any of a variety of flexible borescopes or fiberscopes, rigid borescopes, video borescopes or other devices such as endoscopes which are capable of capturing and transmitting images or videos of difficult-to-reach areas through the communication channel 12. The communication channel 12 in turn may be an optical channel or alternatively, may be any other wired, wireless or radio channel or any other type of channel capable of transmitting images and videos between two points including links involving the World Wide Web (www) or the internet.

With respect to the processing unit 14, it may be located on-site near or on the engine 4, or alternatively, it may be located at a remote site away from the engine 4. A storage medium 20 may be in communication with the processing unit 14. The storage medium 20 may store data and programs used in processing images or videos of the blades 8. The processing unit 14 may receive and process images of the blades 8 that are captured and transmitted by the image capture device 10 via the communication channel 12. Upon receiving the images, the processing unit 14 may process the images to determine whether there are any defects within any of the blades 8.

Results (e.g., the defects) 18 may then be reported through communication channel 16. The results 18 may include information regarding whether any defects in any of the blades 8 were found. Information about the type of defect, the location of the defect, size of the defect, etc. may also be reported as part of the results 18.

Similar to the communication channel 12, the communication channel 16 may be any of variety of communication links including, wired channels, optical or wireless channels, radio channels or possibly links involving the World Wide Web (www) or the internet. It will also be understood that although the results 18 have been shown as being a separate entity from the processing unit 14, this need not always be the case. Rather, in at least some embodiments, the results 18 may be stored within and reported through the processing unit 14 as well. Furthermore, reporting of the results 18 may involve storing the results in the storage medium 20 for future reference, as well as raising alarms when defects are detected.

Figure 2:
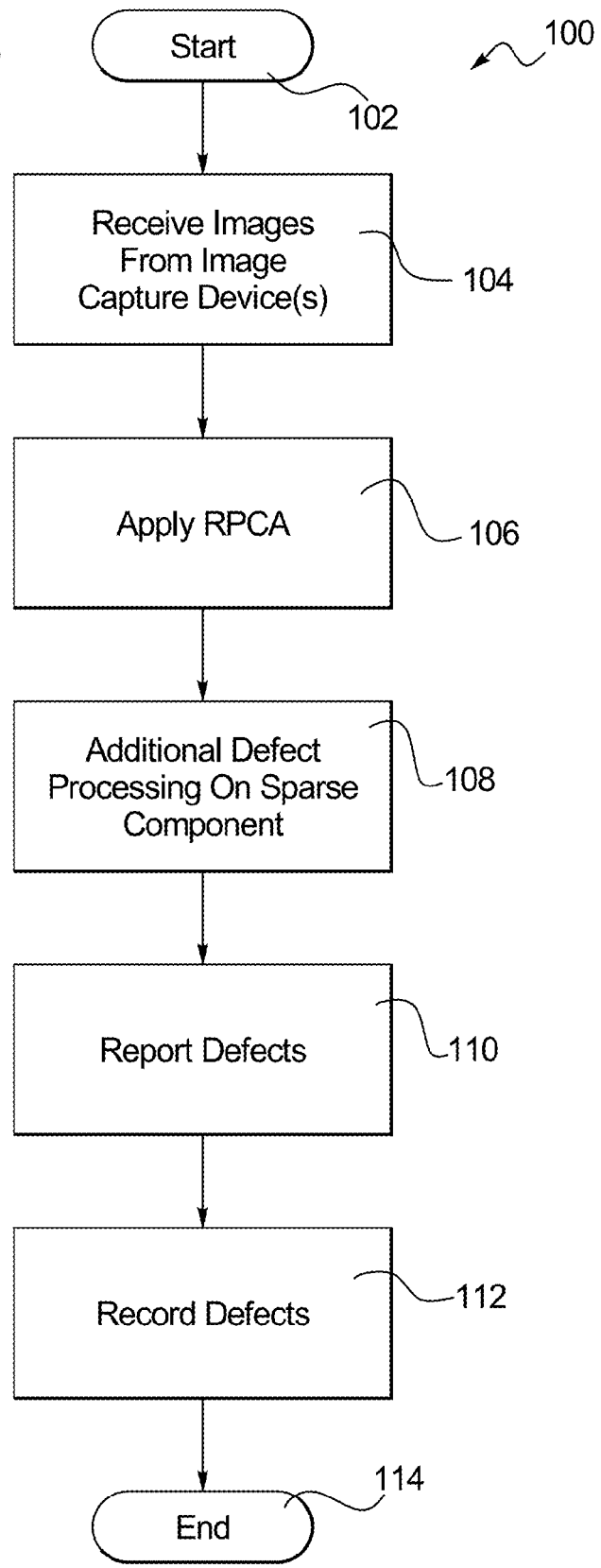
FIG. 2 is a flowchart illustrating exemplary steps of automated defect detection in accordance with the present disclosure.

FIG. 2 is an exemplary flowchart 100 showing sample steps which may be followed in performing automated defect detection using the ABI system 2. As shown, after starting at step 102, the process proceeds to step 104, in which an initial set of images of members of a device may be received by the processing unit 14 from the image capture device 10. In one embodiment, the device may be an engine 4 and the members may be blades 8 within the engine 4. The blades 8 may be located within a stage 6 of the engine 4. The images may be video images. The set of images may be sequential in terms of the order in which they are captured by the borescope (e.g. image one followed by image two, etc.). In other embodiments, the images may be non-sequential with regard to the order in which the images were captured by the image capture device 10. For example, every third image captured by the image capture device 10 may be received by the processing unit 14.

The members may be rotating in the device. For example, the blades 8 may rotate toward or away from the image capture device 10 when the images are being captured. The images captured may be of the same blade 8 in different positions in the field of view of the image capture device 10 and/or may be of a plurality of blades 8 in different positions in the field of view of the image capture device 10. Thus, there may be periodic or semi-periodic motion in the recorded videos of such inspected engine blades 8.

In step 106 the processing unit may apply Robust Principal Component Analysis (RPCA) to decompose the initial set of images received by the processing unit 14 from the image capture device 10 into a first series of low rank component images (low rank matrix) and a second series of sparse component anomaly images (sparse matrix). Using the RPCA technique, the initial series of images are decomposed into a low rank matrix and a sparse matrix utilizing the mathematical equation below.

$$\min_{A,E} \|A\|_* + \lambda \|E\|_1 \text{ s.t. } D = A + E$$

In the equation above, D is the original image data arranged in a matrix of dimension (Height×Width)×Number of Frames. The matrix A is an output image sequence of the same size as D. The matrix A has a distinctive characteristic of being low rank. The matrix A may be visualized as an image sequence when it is represented as Number of Frames frames of size (Height×Width). This low rank part is determined by minimizing the matrix nuclear norm which is the convex relaxation of rank. E is another output image sequence of the same size as D and has another distinctive characteristic of being sparse. The matrix E may be visualized as an image sequence when it is represented as Number of Frames frames of size (Height×Width). The parameter $\lambda$ is the weight factor on the sparse component. Each image from image capture device 10 is one column in the low rank matrix and in the sparse matrix. Other mathematical formulations of RPCA and algorithms for its solution are known in the art and may be used equivalently in step 106.

Typically blades 8 of an engine 4 are of the same size in a given engine stage 6. When a second blade 8 rotates to the same position as that which the first blade 8 had been in previously, the two images taken at the two different instances are generally almost the same. The repetitive, nearly identical images are captured in the A matrix of the equation above. The damaged areas, for example nicks or dents, tend to occupy a small percentage of the entire image and are captured in the sparse matrix E.

Figure 3:
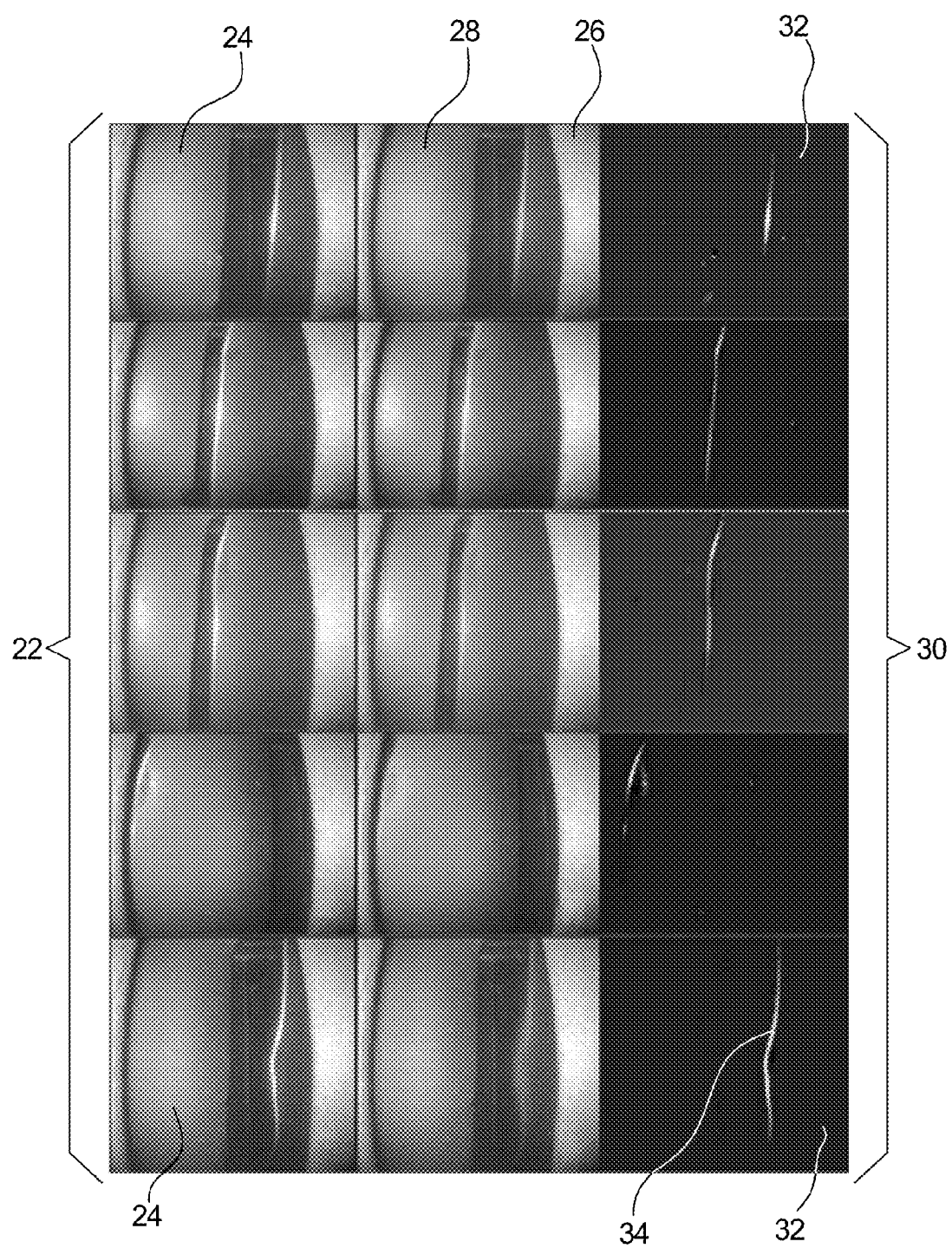
FIG. 3 illustrates an exemplary video image decomposed into low rank component images and sparse component images.

FIG. 3 illustrates an exemplary initial set of video images 24 decomposed into a first series 26 of low rank component images 28 and a second series 30 of sparse component images 32. As can be seen in FIG. 3, the defect portion 34 of a blade 8, for instance, is represented by the sparse component image 32, is generally a relatively small portion of the respective initial image 24.

After separating D, the initial image data matrix, into A, the low-rank part, and E, the sparse part, additional defect processing may be applied in step 108 to process the data in the E (sparse) matrix (the sparse component images (32)) in order to further confirm whether the data in the sparse matrix correspond to physical damage. An example of such additional processing done on the series 30 of sparse component images 32 in the E matrix may include statistical techniques such as polynomial curve fitting, blob extraction and size filtering, morphological filtering, and the like to detect non-smooth edges, to filter out small regions and sporadic pixels etc. Because only the sparse component image 32 of the initial image 24 content undergoes this further processing, defects can be detected much faster and more reliably using algorithms and methods know in the art.

Figure 4B:
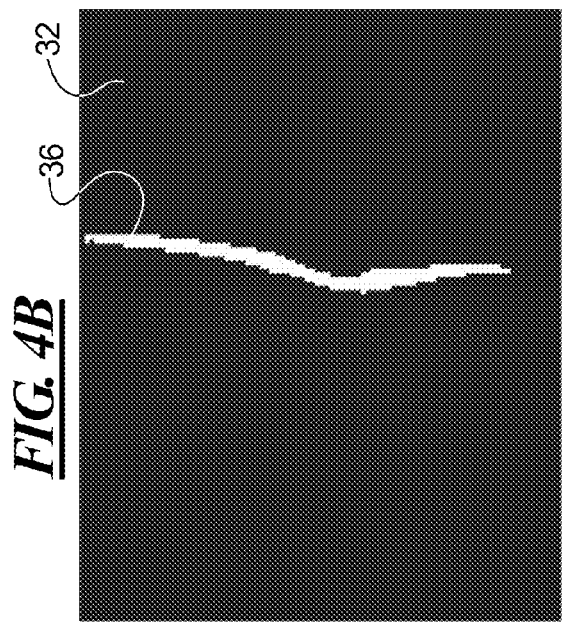
FIGS. 4A-4D show an exemplary technique of further processing of the sparse image component data to confirm the presence of a defect.
Figure 4A:
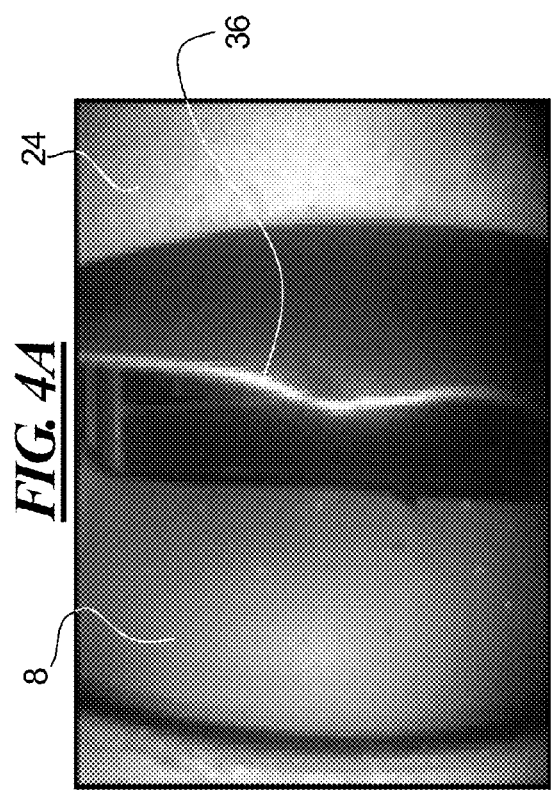
Figure 4D:
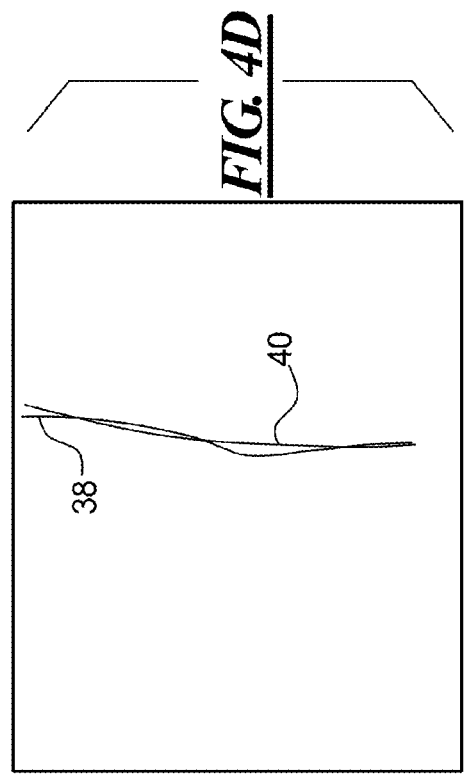
Figure 4C:
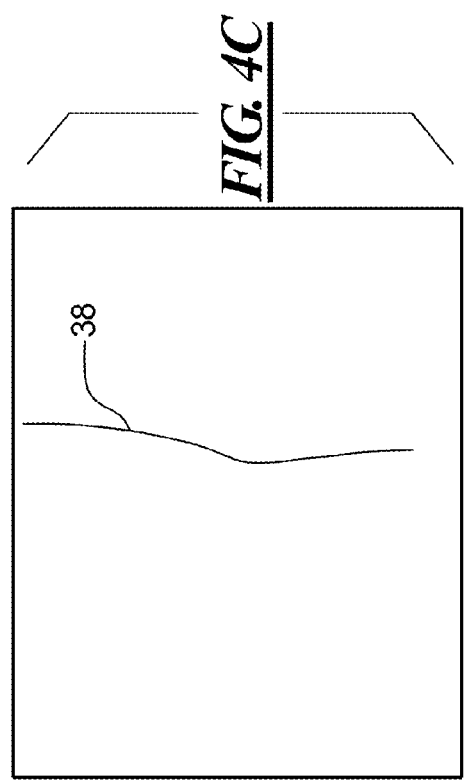

FIGS. 4A-D illustrate one possible example of additional defect processing that may be applied to the sparse component images 32 in the sparse matrix. FIG. 4A illustrates an exemplary initial image 24. FIG. 4B illustrates a sparse component image 32 of the initial image 24. In the initial image 24, it can be seen that an edge 36, in this example a leading edge, appears to be deformed or non-smooth. In FIG. 4B, it can be seen that this potential defect is captured in the sparse component image 32. As part of the processing of the data represented by sparse component image 32, the curve representing the potentially defective edge 36 may be thinned in preparation for curve fitting. FIG. 4C illustrates an example of the thinned edge 38. The thinned curve or edge 38 is then mapped or "fit" to a polynomial curve 40 that approximates the normal edge of the blade 8. In this example, the polynomial is a second order polynomial. If the difference between the polynomial curve and the thinned edge exceeds a predetermined threshold, the blade 8 may be flagged as defective or reported as defective. FIG. 4D illustrates such mapping or fitting between the approximation polynomial curve 40 and the thinned edge 38 derived from the sparse component image 32. In other embodiments, other types of curves for fitting may be used as well corresponding to the properties of curves in the sparse component.

Figure 5A:
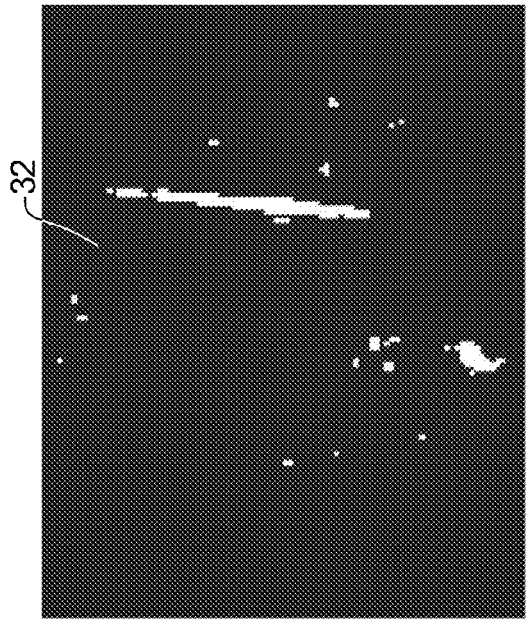
FIGS. 5A-5C show another exemplary technique of further processing of the sparse image component data to confirm the presence of a defect.
Figure 5B:
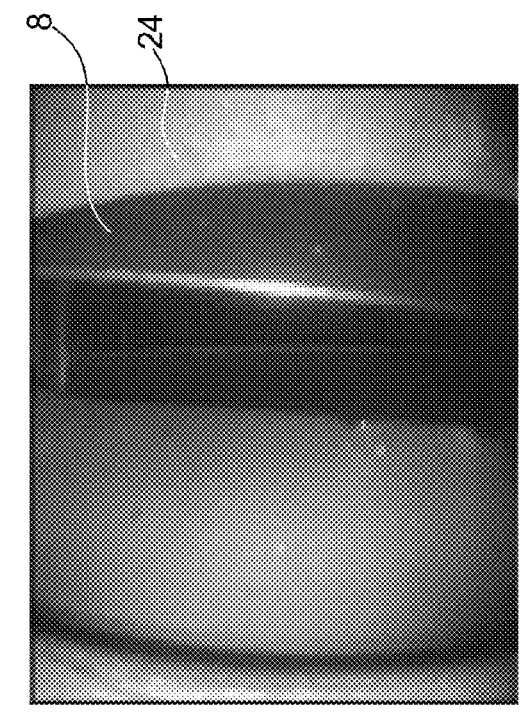
Figure 5C:
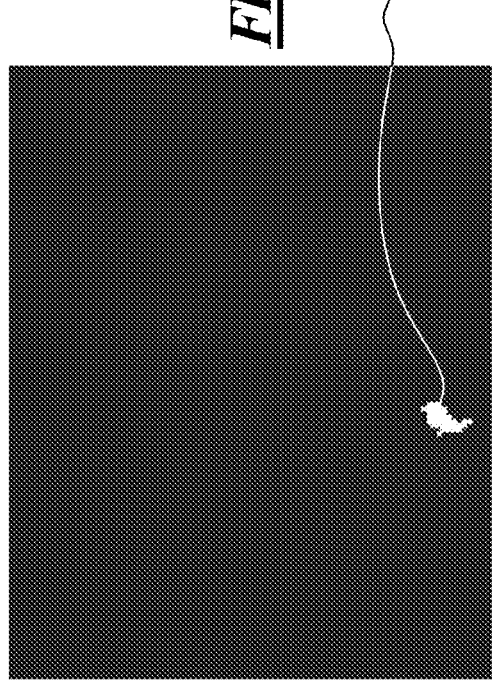

Yet another example of additional processing on sparse component images 32 that may be performed is what is known in the art as blob extraction or size and shape filtering. The shape filtering may be based on the aspect ratio of the blob. FIGS. 5A-C illustrate one example of this processing. FIG. 5A shows an initial image 24 of a blade 8. FIG. 5B illustrates the sparse component image 32 for the initial same blade image 32. In the sparse component image 32 a number of potential defects can be seen. Defects such as dents tend to be larger than other anomalies in the sparse component image 32 that may be caused by carbon deposits, sporadic pixels, and the like. As such, size and shape filtering, as is known by those of skill in the art, may be applied to filter out from the sparse component image 32 those anomalies that fall below a predetermined size threshold. FIG. 5C illustrates a filtered sparse component image 32 on which there is one dent remaining after size and shape filtering.

FIGS. 4-5 illustrate just a few examples of further defect processing that may be done on the sparse component image 32. Other types of additional processing and filtering, as are known in the art, may be applied instead of or in addition to such processing on the sparse component images 32 to further automatically analyze potential defects.

After finding defects at step 108, those defects may be reported at a step 110. As discussed above, reporting the defects may involve raising alarms to alert personnel to further inspect, replace or fix the defective blade 8. In addition to reporting the defects at the step 110, the defects may also be recorded in the storage medium at a step 112 for future reference. The process then ends at a step 114.

INDUSTRIAL APPLICABILITY

In general, the present disclosure sets forth a computer program product and method for performing automated defect detection. The method may include providing storage medium for storing data and programs used in processing video images, providing a processing unit for processing such the video images of the blades of an engine captured and transmitted by a borescope, and using the processing unit to decompose each of the images using Robust Principal Component Analysis into a low rank matrix and a sparse component matrix. The method may further include further processing of image data in the sparse matrix that indicates a possible defect in order to provide further assurance of the presence of a defect in the plurality of blades. The method may also include applying the described process to other component(s) or mechanical systems.

The present disclosure provides for an automated visual inspection using automatic image analysis in which human involvement, required a priori knowledge, and manual parameter tuning is minimized, thereby minimizing human related errors and improving inspection reliability and speed. Also, the present disclosure teaches defect detection using a statistical anomaly detection program and then processing the data further that has been identified as a potential defect instead of processing an entire image searching for a wide range of defects.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of performing automated defect detection, the method comprising:
    providing a storage medium for storing data and programs used in processing images;
    providing a processing unit for processing the images;
    receiving from an image capture device an initial set of video images of a plurality of members in motion inside of a device; and
    using the processing unit to apply Robust Principal Component Analysis to decompose the initial set of video images into a first series of low rank component images and a second series of sparse component images simultaneously, the first series of low rank component images representing the members and the second series of sparse component images representing defects in the members, wherein there are at least two images in the initial set.

2. The method of claim 1, wherein the images in said initial set of images are not sequential.

3. The method of claim 1, wherein there is more than one image of each member in the initial set of images.

4. The method of claim 1, in which the initial set of images includes a first image of a first member and a second image of a second member, wherein the first image and the second image are at different positions in the field of view.

5. The method of claim 1, wherein the plurality of members inside the device are rotating.

6. The method of claim 1, wherein the first series is in a low rank matrix and the second series is in a sparse matrix.

7. The method of claim 1, wherein the device is an engine and each member is a blade within a stage of the engine.

8. The method of claim 1, further comprising determining whether there are defects within the plurality of members using the second series.

9. The method of claim 1, further comprising processing the second series of images to detect edge defects in one of the members using curve fitting.

10. The method of claim 1, further comprising using one of size and shape filtering on the second series of images to detect whether there is a defect in a member.

11. A method of performing automated defect detection on blades in an aircraft engine, the method comprising:
   providing a storage medium for storing data and programs used in processing video images;
   providing a processing unit for processing the video images;
   receiving from an image capture device video images of a plurality of the blades in motion inside of the engine;
   using the processing unit to decompose the video images using Robust Principal Component Analysis into a low rank matrix and a sparse matrix simultaneously, the low rank matrix representing the blades and the sparse matrix representing defects in the blades; and
   utilizing video image data in the sparse matrix to determine whether there are possible defects within the plurality of blades.

12. The method of claim 11, further comprising processing the video image data in the sparse matrix to detect whether there is a potential edge defect in any of the blades.

13. The method of claim 12, wherein the processing step further includes fitting a second order polynomial curve to a potential edge defect.

14. The method of claim 11, further comprising processing the video image data in the sparse matrix using size filtering to detect whether there is a defect in any of the blades.

15. The method of claim 11, wherein the sparse matrix represents video images of potential defects.

16. The method of claim 11, wherein the video images are non-sequential video images.

17. The method of claim 11, wherein there are at least two blades in the plurality of blades.

18. A non-transitory computer program product, comprising a computer usable medium having a computer readable program code embodied therein, the computer readable program code adapted to be executed to implement a method for performing automated defect detection on blades in an aircraft engine, the method comprising:
   receiving from an image capture device video images of a plurality of the blades in motion inside of the engine; and
   decomposing the video images using Robust Principal Component Analysis into a low rank matrix and a sparse matrix simultaneously, the low rank matrix representing the blades and the sparse matrix representing defects in the blades.

19. The computer program product of claim 18, wherein the defects may be one of edge defects and dents.

20. The computer program product of claim 18, wherein the video images are non-sequential video images.

* * * * *